D. P. RANSOM.
LINE INSULATOR.
APPLICATION FILED AUG. 21, 1915.
1,177,354.
Patented Mar. 28, 1916
2 SHEETS—SHEET 1.
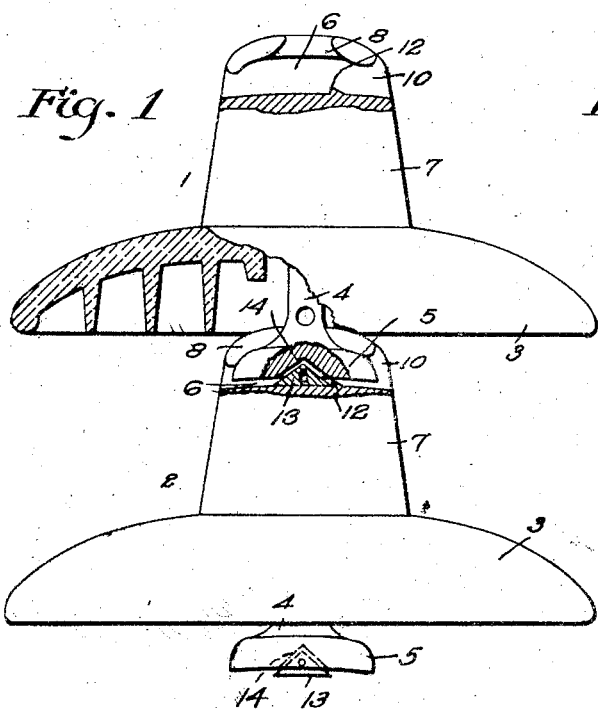
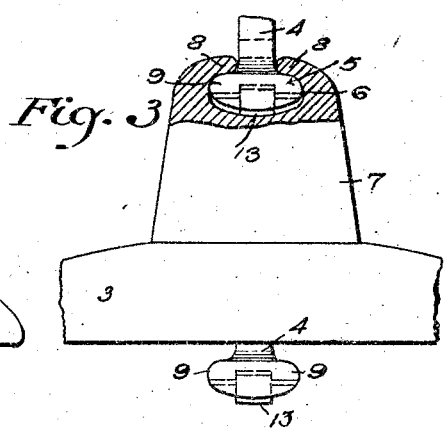
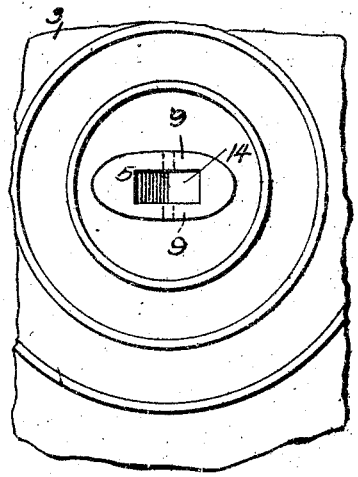
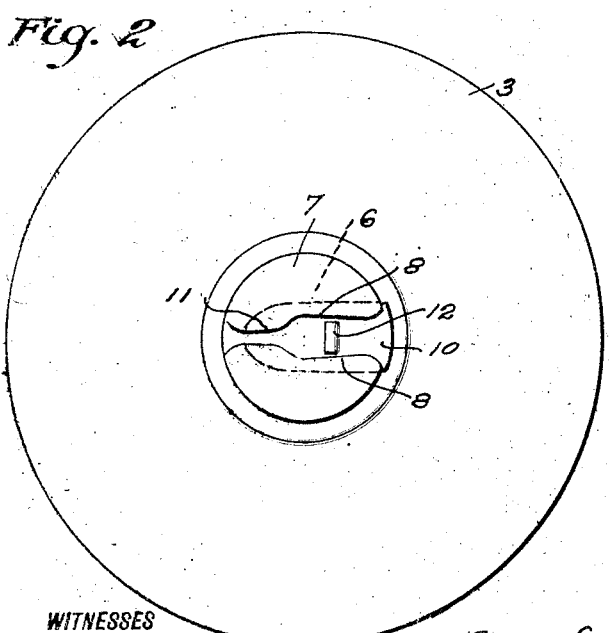
WITNESSES
INVENTOR
D. P. Ransom
BY Munn & Co
ATTORNEYS

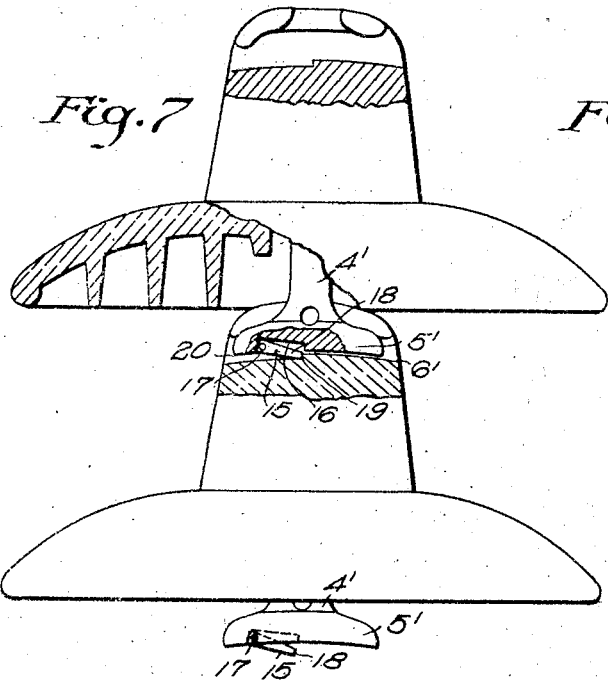
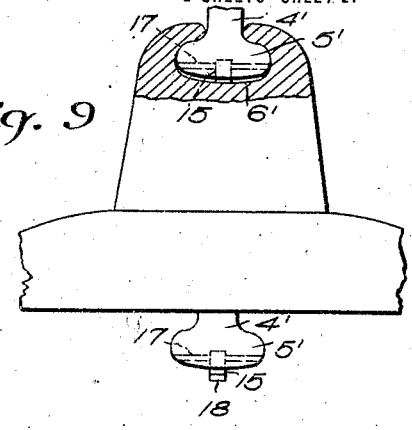
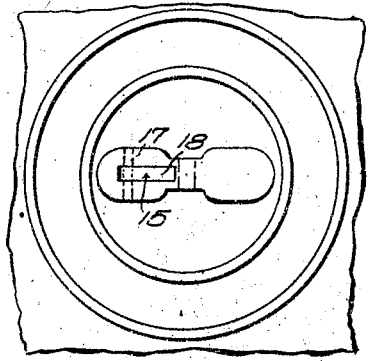
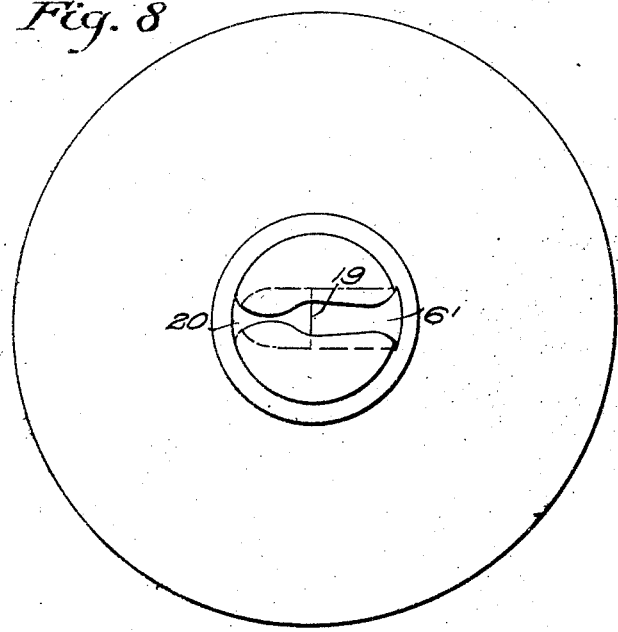
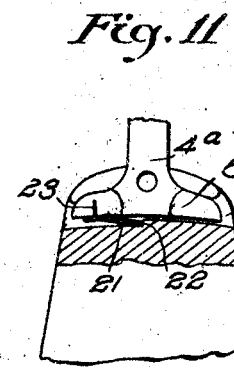

UNITED STATES PATENT OFFICE.

DANIEL PARKE RANSOM, OF WOODSTOCK, VERMONT.

LINE-INSULATOR.

1,177,354.  Specification of Letters Patent.  Patented Mar. 28, 1916.

Application filed August 21, 1915. Serial No. 46,750.

*To all whom it may concern:*

Be it known that I, DANIEL P. RANSOM, a citizen of the United States, and a resident of Woodstock, in the county of Windsor and State of Vermont, have invented a new and Improved Line-Insulator, of which the following is a full, clear, and exact description.

This invention relates to insulators especially adapted for electric transmission lines, and has to deal more particularly with insulators of the suspension disk multiple-petticoat type.

The invention has for its general objects to improve the construction of insulators of the character referred to so as to be of durable and substantial design, reliable and efficient in use and made in sections which are detachably connected together.

The more specific object of the invention is the provision of a novel connecting means between the sections of the insulator, whereby the sections can be easily and quickly connected without the use of bolts, screws or equivalent separable fastenings, the connecting means being so designed that the two sections can be easily connected or disconnected when the latter are in inverted position, or when in a horizontal position by use of any thin instrument inserted to raise the block, key or spring clear of the shoulder or lock, but which sections are locked against detachment when the insulator is in upright or horizontal position.

With these objects in view, and others which will appear as the description proceeds, the invention comprises various novel features of construction and arrangement of parts which will be set forth with particularity in the following description and claims appended hereto.

In the accompanying drawing, which illustrates certain embodiments of the invention and wherein similar characters of reference indicate corresponding parts in all the views, Figure 1 is a side view of a portion of an insulator with parts in section to show the details of construction; Fig. 2 is a plan view of one of the insulator sections; Fig. 3 is a fragmentary side view of one of the sections; Fig. 4 is a bottom plan view of the central part of an insulator; Fig. 5 is a detail sectional view showing the relative position of two sections when they are being connected or disconnected; Fig. 6 is a perspective view of the locking block of the connecting means between adjacent sections; Fig. 7 is a side view similar to Fig. 1, but showing a modified form of locking means between adjacent sections of the insulator; Fig. 8 is a plan view of one of the sections shown in Fig. 7; Fig. 9 is a fragmentary side view showing the connecting means between adjacent sections; Fig. 10 is a fragmentary bottom plan view of one of the sections; and Fig. 11 is a detail view of a further modified construction.

Referring to the drawing, 1 and 2 designate connected insulator sections having petticoat portions 3 of any desired construction, and depending from the center of each section is a stem or bolt 4 that terminates at its bottom in an oval shaped head 5 which is adapted to interlock in a channel 6 in the top of the metal boss or body 7 of the section next below. The channel is formed with undercut walls to provide shoulders 8 that engage over the opposite marginal portions or flanges 9 of the plate 5. The channel has an opening or mouth 10 at one side so that the plate 5 can slide into and out of it, but the channel is constricted at 11 so as to prevent the plate 5 from passing beyond a position where the stem 4 will be directly over the center of the body 7 of the section suspended by such stem. The bottom of the chamber has a transverse rib or stop 12 behind which a prismatic locking block 13 is adapted to engage to lock two adjacent sections together, this block being loosely hung from the bottom of the head 5. The under side of the plate 5 has a recess 14 large enough to accommodate the locking block when the insulator sections are inverted, as shown in Fig. 5. While in this position the block can slide past the stop 12, both in connecting and disconnecting the adjacent sections, but when the insulator sections are inverted the block drops behind the stop 12 and still partially extends into the pocket or recess 14 so as to prevent the adjacent blocks from disconnecting by relative lateral movement.

When it is desired to disconnect the sections when not installed for use, they are inverted to cause the locking block to drop out of engagement with the stop 12, so that the plate 5 on the stem 4 can slip laterally out of the channel 6. To remove defective insulators from a line or to separate adjacent sections, the block 13 may be lifted into the recess by inserting a thin blade instrument into the channel 6 from the side opposite from the stop or lock 12 and lifting the block by the instrument above the lock 12 so as to clear the latter as the insulator sections are separated, this separation being possible while the insulator is in a horizontal, vertical or inclined position. It will thus be seen that the sections can be easily and quickly connected or disconnected, and when once connected the structure is durable and nearly rigid, or at least to a degree that will effectually prevent damage to the porcelain by contact of the porcelain of one unit or section with the metal or porcelain of the adjacent unit, or with the wire clamp when attached.

In the construction shown in Figs. 7 to 10 inclusive the locking means between adjacent sections comprises a key or catch 15 which is set into a chamber 16 in the bottom surface of the oval-shaped head 5' of the bolt or stem 4', one end of the key being mounted on a pivot 17 so that its free end 18 may engage a shoulder, stop or lock 19 formed in the bottom of the channel 6'. The key will be maintained by gravity in locking position, as shown in Fig. 7. To throw the key to unlocking position it is merely necessary to insert a flat-blade instrument into the open end 20 of the channel 6' so that the instrument will hold the key raised or released from the shoulder 19, whereupon the sections of the insulator can be detached by relative lateral movement causing the head 5' to slide out of the larger end of the channel 6'.

In the modification shown in Fig. 11 a resilient catch 21 is mounted on the head 5$^a$ of the stem 4$^a$, so as to engage a lock, shoulder or stop 22 in the bottom of the channel 6$^a$. The resilient catch is in the form of a leaf spring secured by a suitable fastening 23 to the bottom of the head 5$^a$, and the free end of the spring is adapted to engage the shoulder 22, as shown in Fig. 11. This spring catch is disengaged in the same manner as is the pivoted catch shown in Fig. 7.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a pair of insulator sections, one section having a channel provided with undercut walls, both ends of the channel being open and one open end being larger than the other, a member on the other section having a head engageable in the channel through the larger open end thereof, and interlocking means between the head and channel and adapted to be unlocked by the insertion of an instrument through the smaller open end of the channel, said locking means including a movable element arranged to yield during the insertion of the head in the said channel, and adapted to automatically lock when the head reaches a predetermined position in the channel.

2. The combination of a pair of insulator sections, one section having a channel, a member on the other section engageable in the channel, a catch on the member, and a stop in the bottom of the channel with which the catch automatically engages by the insertion of the member into the channel, said channel having an opening for the insertion of an instrument to release the catch to permit the separation of the sections.

3. An insulator comprising sections, said sections having uniting means connected and disconnected by relative transverse movement of the sections, and a lock automatically yieldable to permit the uniting means to be connected and automatically set after the said uniting means are connected, said uniting means having an opening for the insertion of an instrument to unlock the lock.

4. The combination of a pair of insulator sections, one section having a channel, the other section having a stem provided with a head engageable in the channel, a catch mounted on the head, and means in the channel with which the catch automatically engages by the insertion of the head into the channel.

5. The combination of a pair of insulator sections, one section having a channel, the other section having a stem provided with a head engageable in the channel, a catch mounted on the head, and means in the channel with which the catch automatically engages by the insertion of the head into the channel, said channel having an opening for the insertion of an instrument to throw the catch to unlocking position for permitting of the separation of the insulator sections.

6. The combination of a pair of insulator sections, one section having a channel and the other section having a member engageable in the channel, a spring catch in the said member, and means in the channel with which the catch automatically engages when the member is inserted in the channel, said channel having an opening for permitting an instrument to be inserted to release the spring catch.

7. An insulator section having a portion provided with a channel formed with an undercut wall and open at its ends, one open end being larger than the other, and a shoulder in the bottom of the channel located at a point intermediate the ends of the latter, in combination with another insulator having a member engaging in the channel from the larger end, and means on the member for interlocking with the said shoulder.

8. An insulator section having a depending member provided with a head, and a spring catch fastened to the bottom of the head and provided with a free end projecting from the bottom surface of the head.

In testimony whereof I have signed my name to this specification in the presence of two subscribing witnesses.

DANIEL PARKE RANSOM.

Witnesses:
J. R. PEMBER,
K. O. PEMBER.